United States Patent [19]

Fischer et al.

[11] Patent Number: 4,892,585

[45] Date of Patent: Jan. 9, 1990

[54] PROCESS FOR PRODUCING ARTICLES MADE FROM POLYURETHANE FOAM AND ADDITIVE FOR PERFORMING THIS PROCESS

[75] Inventors: Wolfgang Fischer, Morlenbach; Thomas Hattich; William Krug, both of Heidelberg; Gerhard Schuster, Nuremberg, all of Fed. Rep. of Germany

[73] Assignee: Grace Service Chemicals GmbH, Heidelberg, Fed. Rep. of Germany

[21] Appl. No.: 248,698

[22] Filed: Oct. 17, 1988

Related U.S. Application Data

[62] Division of Ser. No. 927,896, Nov. 6, 1986, Pat. No. 4,783,296.

[30] Foreign Application Priority Data

Nov. 21, 1985 [DE] Fed. Rep. of Germany ....... 3541513

[51] Int. Cl.$^4$ ................................................ B28B 7/36
[52] U.S. Cl. ............................... 106/38.22; 106/38.24; 427/133; 427/135
[58] Field of Search .......................... 106/38.22, 38.24; 427/133, 135

[56] References Cited

U.S. PATENT DOCUMENTS

| | | | |
|---|---|---|---|
| 3,893,868 | 7/1975 | Klement et al. | 264/338 |
| 3,992,502 | 11/1976 | Krishnan | 264/338 |
| 4,028,120 | 6/1977 | Emond | 427/135 |
| 4,029,682 | 6/1977 | Foulks | 106/268 |
| 4,040,996 | 8/1977 | Van Vonno | 106/271 |
| 4,491,607 | 1/1985 | Wesala | 427/135 |
| 4,544,694 | 10/1985 | Bower | 106/268 |
| 4,783,296 | 11/1988 | Fisher et al. | 264/338 |

Primary Examiner—Theodore Morris
Attorney, Agent, or Firm—Steven T. Trinker

[57] ABSTRACT

A process for producing polyurethane foam articles is described, in which the article is produced in the conventional manner by foaming in a mould and a release agent is applied to the mould surface prior to filling with the foam-producing components. According to the invention, a solvent-free, aqueous release agent is used in combination with one or more alkali metal and/or ammonium salts of higher fatty acids and one or more higher alcohols and the combination is applied in the hot state, preferably at a temperature of at least 75° C. to the mould surface. In addition, an additive is described, which is suitable for performing the process according to the invention and contains one or more alkali metal and/or ammonium salts of higher fatty acids, one or more higher alcohols and otherwise water. The process according to the invention has the advantage that it not only avoids the use of environmentally prejudicial organic solvents, but also leads to excellent release agent films, from which the water is very largely evaporated within a very short time and namely within the very short cycle times of modern foam plants.

14 Claims, No Drawings

PROCESS FOR PRODUCING ARTICLES MADE FROM POLYURETHANE FOAM AND ADDITIVE FOR PERFORMING THIS PROCESS

This is a division of Ser. No. 927,896, filed Nov. 6, 1986, now U.S. Pat. No. 4,783,296, issued Nov. 8, 1988.

The invention relates to a process for producing polyurethane foam articles, in which the article is produced in a conventional manner by foaming in a mould and prior to filling with the foam-producing components, the mould is treated with a release agent.

Polyurethane foam articles are produced in moulds and this can take place according to the most varied prior art processes. A large number of possible variants, which are known to the Expert, exist with respect to the foam-producing components to be used and with respect to the equipment and moulds to be used. Generally the mould is filled either in the open or closed state through a feed channel using the polyol and isocyanate components mixed by means of a mixing head. Apart from the sought product and its desired characteristics, the composition of the components depends on whether working is to take place according to the one-shot process (direct process) or according to the two-shot process (prepolymer or semiprepolymer process). All these different possible procedures are described in the literature, so that there is no need for a detailed discussion thereof. For example, reference is made to "Integralschaumstoffe", Piechota and Rohr, 1975; Kunststoff-Handbuch, vol. VII, "Polyurethane", 1966: "Schaumkunststoffe", published by the Fachverband Schaumkunststoffe in GKV, 1976 and Wittfoht, Kunststoff-Technisches Worterbuch, part 3.

In order to permit an easy, clean removal of the foam articles completely polymerized in the metal, wood or plastic moulds, the mould surfaces coming into contact with the foam-producing components or the polyurethane foam are treated with release or parting agents (mould release agents) prior to the filling of the mould. For this purpose, the mould surfaces are given a uniform coating of a release agent, thereby producing a release film. This conventionally takes place by known spraying and injection processes, the release agent being atomized by the high material pressure or by additional compressive forces. Apart from good mould release characteristics, in special cases the release agent must also exert an influence with regards to the surface properties of the finished polyurethane foam article. Thus, specific additives. e.g. in the cold flexible foam field (seats, headrests, armrests, etc. in cars) produce the open-cell structure and consequently enable the foam article to "breathe" in the necessary way.

Conventional release agents consist of organic solvents and release-active substances dissolved, dispersed, suspended or emulsified therein and which are referred to as solids. As is known, they can contain waxes, greases, fats, silicone compounds, fatty acid amines, fatty acid esters, plasticizers, stabilizers, accelerators, etc. The main solvents present in the release agent, such as e.g. frigen, methylenchloride, trichloroethane, perchloroethylene, gasoline and high-boiling gasoline hydrocarbons are used as carriers, so that the release-active substances can be applied as a uniform release film to the mould surfaces.

The solids composition, solids proportion and solvent combinations are fixed as a function of the mould temperature, the air-exposure time (time between release agent application and component introduction) and the particular foam system (integral skin, rigid integral skin or cold flexible foam). In this way it is possible to produce the most varied articles with widely differing characteristics. Thus, e.g. integral skin foam is used for producing steering wheels for cars, special requirements being made on the surface (uniformity and good gripping characteristics). When producing integral skin foam, the mould temperature is generally between 30° and 50° C. However, the mould temperature in the RIM process (RIM foam), frequently use for producing polished mouldings is 50° to 70° C. Similar temperatures, namely in the range 40° to 70° C., are exhibited by the moulds in producing articles from cold flexible foam, such as seats, headrests and armrests for cars. The mould temperature is generally 30° to 50° C. when producing articles from rigid from, such as brackets for cars, window shutters, refrigerator components, furniture parts and chairs.

On introducing the release agent, which generally takes place by means of a spraying or injection apparatus, the solvents largely evaporate as an azeotropic mixture from the mould surface heated to between 25° and 70° C., as a function of the foam system present. Together with the overspray, these vapours are removed by means of corresponding exhausting units from the working area. Quite apart from the loss of valuable raw materials, such pollutant emissions are highly prejudicial to the environment. Recycling processes with adsorption plants would be conceivable, but in this case the solids present in finely divided form, which cannot be eliminated either by filters or water walls constitute a serious problem. The absorption coatings immediately covered with wax and fat would have to be regenerated at very short time intervals, which would lead to very considerable expenditure and effort.

As a result of the aforementioned problems, attempts have been made for some time to use water-based release agents, i.e. release agents in which the organic solvents are largely and preferably completely replaced by water. Low solvent or solvent-free release agents are known. They are essentially fat, wax or soap emulsions or dispersions. The problem exists in connection with these release agents that following release agent application, in most of the aforementioned foam systems the mould can only be filled with the foam-producing components when the solvent, in this case water, has largely evaporated, so that the polymerization process is not prejudiced.

The reason why inadequate evaporation of the water when using aqueous release agents leads to lower quality products is the competing reaction between water and isocyanate groups ($R-N=C=O + H_2O \rightarrow R-NH_2 + CO_2$) running parallel to the polyol-isocyanate reaction, leading to the liberation of carbon dioxide and a partial displacement of the precisely matched polyol-isocyanate ratio. This leads to foam disturbances in the mould ranging from discolourations, bubbles, voids (blisters) to partial foam collapse. Since due to the system-based circulation cycles of modern foam plants generally only 10 to 50 seconds at temperatures of max. 65° C. are available for evaporating the release agent films, which has been proved inadequate for a sufficient elimination of the water from the more or less strongly water-combining release film, aqueous release agents cannot be used in most of the existing foam technologies.

It is known to use aqueous release agents for the almost completely superseded hot foaming, where water evaporation is brought about by high energy-consuming mould temperatures. In addition, aqueous release agents are used where only limited demands are made on the surface quality of the foam articles produced, because their surfaces are not visible. An example of this is back-foaming.

In order to be able to economically use aqueous release agents in other fields, approximately 10 to 30% evaporation accelerators have been added thereto for reducing the airing times. These consist of low-boiling alcohols, ketones, esters, etc. which apart from the possible interfering reactions with the isocyanate, also are a burden on the environment. The use of such part aqueous, part solvent-containing systemshas not as yet proved successful in practice.

Thus, the problem of the invention is, whilst obviating the disadvantages linked with the poor evaporation behaviour of the water, to permit the economic and environmentally nonprejudicial use of aqueous release agents, also in those foam systems, where this has not hitherto been possible as a result of the brevity of the system and plant-based cycle times.

According to the invention this problem is solved by a process for producing polyurethane foam articles of the aforementioned type, wherein a solvent-free, aqueous release agent is used In combination with one or more alkali metal and/or ammonium salts of higher $C_{18}$–$C_{30}$ -fatty acids and one or more higher $C_4$–$C_{26}$- alcohols and the combination is applied to the mould surface in the hot state.

It has surprisingly been found that the process according to the invention leads to a drastic reduction in the airing time of the release films applied and to a very large removal of the water from the release agent film. This is all the more surprising in that the soap emulsions known per se as release agents lead to an aqueous micella formation during the evaporation process. It is also surprising that the water-combining psuedocrystalline structures occurring when using conventional emulsifiers are apparently eliminated by the procedure according to the invention. The combination used according to the invention is in the hot state a highly fluid release agent, which forms a uniform release agent film from which the water is largely evaporated within the aforementioned short cycle times of industrial foam plants.

There are no limitations with regards to the aqueous release agents usable in the process according to the invention and which are completely or at least substantially free from organic solvents, i.e. they are present in the form of emulsions or dispersion and contain conventional releaseactive substances and solids (see hereinbefore), which are incorporated into the aqueous base. This takes place in accordance with the conventional processes of emulsion and dispersion technology (cf. e.g. Seifen-Öle-Fette-Wachse, vol. 107, No. 14, 1981, pp 391 to 402). Generally the water or at least part thereof is introduced first and then the different release-active substances and optionally conventional additives (see hereinafter) are incorporated into these substances and if necessary emulsifiers are used. The sequence of incorporating the release-active substances can be chosen at random. It is obviously possible to use elevated temperatures for facilitating the emulsification process. No further details need be provided in this connection, because the Expert is able to fix the composition of the release agent in accordance with the particular requirements of the case and choose the in each case most favourable procedure for producing such a release agent.

Particularly suitable for the process according to the invention are aqueous release agents, which contain as the release-active substance synthetic and/or natural waxes, such as microwax and in particular polyethylene wax. The choice of the in each case suitable wax falls within the routine activity of the Expert and is dependent on the intended use. Thus, e.g. for cold flexible foam softer (lower melting) waxes are used than when producing articles from integral skin foam.

As stated hereinbefore, the aqueous release agents used according to the invention can contain further conventional components. These include inter alia biocides, polyurethane foam stabilizers matched to the system such as e.g. silicone glycols or polysiloxane glycols and accelerators, such as the tin accelerators (e.g. dibutyl tin dilaurate) and amine accelerators (e.g. bis-(2-dimethylaminoethyl)-ether) used in the prior art solvent systems. In order to obtain the open-cell structure often required in cold flexible foam (see hereinbefore), it is possible e.g. to incorporate commercially available glycolsiloxane surfactants (silicone -glycol copolymers). These water-soluble surfactants can also be directly added to the polyol component.

The additive which according to the invention is combined with the aqueous release agent consists of an aqueous solution of one or more alkali metal salts, preferably potassium salts, of higher $C_{18}$–$C_{30}$ and preferably $C_{22}$–$C_{26}$-fatty acids and one or more higher $C_4$–$C_{12}$ and preferably $C_6$–$C_{10}$-alcohols. The additive is prepared by introducing the alkali metal salt or salts of the higher fatty acid or acids or the fatty acids and lye, or ammonia or amines (see above) as well as the higher alcohol or alcohols into water and heating the mixture to approximately 80° C., accompanied by stirring. The higher alcohol content of the thus prepared additive is 1 to 12% by weight. The content of alkali metal salt of higher fatty acid is usually in the range of 1 to 20% by weight and preferably 5 to 9% by weight. The additive is added in an adequate quantity and normally a quantity of 10 to 50% by weight to the aqueous release agent used according to the invention, as a function of its characteristics and its intended use.

Alternatively the components of the aforementioned additive, namely the alkali metal and/or ammonium salt or salts of higher fatty acids and the higher alcohol or alcohols can be added directly to the aqueous release agent. This preferably takes place directly prior to the use of the release agent in order to avoid double heating. This procedure is less preferred than the use of the previously described additive.

The aqueous release agent and the additive combined therewith according to the invention are brought together accompanied by thorough mixing and are usually heated in a continuous heater to the desired temperature of at least 75° C. and preferably at least 80° C. The heated combination is permanently kept circulating, in order to ensure a uniform thorough mixing and avoid a separation of any components. The combination heated to the desired temperature is then applied in a conventional manner to the mould surface, which preferably takes place by spraying (see hereinbefore).

It is important that the concentration of the higher alcohol or alcohols in the combination used according to the invention is no greater than 6% by weight and preferably no greater than 4% by weight. Correspondingly the concentration is usually in the range 1 to 6% by weight. The concentration of the alkali metal and/or ammonium salt or salts of higher fatty acids, based on the total combination, is generally in the range 0.5 to 10% by weight and preferably 2 to 7% by weight.

As stated hereinbefore, the use of the inventive combination or aqueous release agent and alkali metal and/or ammonium salts of higher fatty acids, as well as higher alcohols leads to a drastic reduction of the evaporation times of the release agent films applied and to a very high degree of elimination of the water from the release agent film. This effect only occurs if the aqueous release agent mixed with the additive is heated to at least 75° C. prior to application. Apart from the surface tension reduction, this effect is probably due to the destruction of the aqueous micella occuring when using conventional soap emulsions, as well as to the removal of water-combining pseudocrystalline structures, which are caused by the use of conventional emulsifiers. In addition, a destruction of the emulsions which are otherwise usually unstable at these temperatures is avoided through the stabilizing action of the additive used according to the invention. The inventive additive has in itself releaseactive characteristics and consequently additionally improves the release effectiveness of the conventional release emulsions.

When producing articles from cold flexible foam (car parts) very good results have been obtained with the following aqueous release agent in accordance with the inventive process:

| | |
|---|---|
| Polyethylene wax | 0.5% by weight |
| Emulsifier (secondary linear alkane sulphonate in the form of the sodium salt; 60% effective substance) | 1.3% by weight |
| Foam stabilizer (see hereinbefore) | 0.3% by weight |
| Water | Remainder |

This aqueous release agent was combined with different quantities (e.g. in a ratio of 3:1) of the additive composed in the hereinafter indicated form:

| | |
|---|---|
| Behenic acid | 8% by weight |
| KOH | 1.6% by weight |
| $C_6$–$C_{10}$—alcohol | 4% by weight |
| Water | Remainder |

We claim:

1. A release agent composition comprising an aqueous carrier fluid, a mould release agent, an alkali metal or ammonium salt of a $C_{18}$–$C_{30}$-fatty acid and a $C_4$–$C_{26}$-alcohol.

2. A composition according to claim 1 wherein said alcohol is a $C_4$–$C_{12}$-alcohol.

3. A composition according to claim 1 comprising up to about 10 percent by weight of said alkali metal salt of a $C_{18}$–$C_{30}$-fatty acid.

4. A composition according to claim 1 comprising up to about 6 percent by weight of said $C_4$–$C_{26}$-alcohol.

5. A composition according to claim 2 wherein said alcohol is a $C_6$–$C_{10}$-alcohol.

6. A composition according to claim 1 wherein said fatty acid is a $C_{22}$–$C_{26}$- fatty acid.

7. A composition of claim 1 wherein said fatty acid is behenic acid.

8. A composition of claim 1 wherein said fatty acid is potassium behenate.

9. A method of reducing the evaporation time of an aqueous release agent composition, comprising adding thereto an aqueous additive comprising about 1% to about 12% by weight of a $C_4$–$C_{26}$-alcohol and about 1% to about 20% of an alkali metal or ammonium salt of a $C_{18}$–$C_{30}$-fatty acid.

10. A method of claim 9 wherein said alcohol is a $C_4$–$C_{12}$-alcohol.

11. A method of claim 10 wherein said alcohol is a $C_6$–$C_{10}$-alcohol.

12. A method of claim 9 wherein said fatty acid is a $C_{42}$–$C_{26}$-fatty acid.

13. A method of claim 9 comprising adding about 10% to about 50% by weight of said additive to said aqueous release agent composition.

14. A method of claim 9 further comprising heating the combination of said aqueous release agent composition and said additive to at least about 75° C., and then applying the same to a mould.

* * * * *